Patented Aug. 16, 1927.

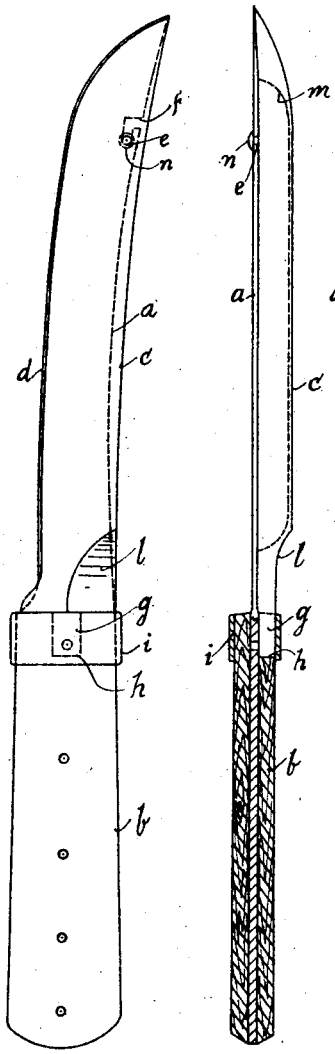
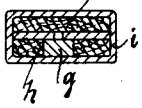
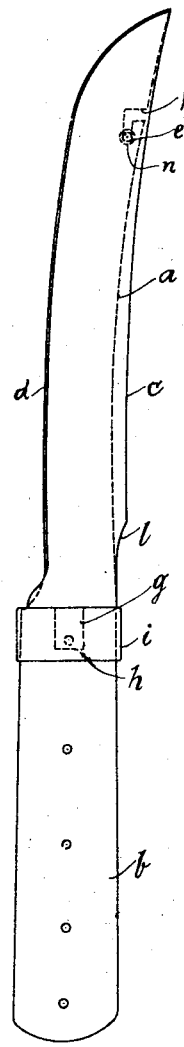

1,638,883

UNITED STATES PATENT OFFICE.

FRITZ SCHULZ, OF KONIGSBERG, GERMANY.

SKINNING KNIFE.

Application filed March 13, 1926. Serial No. 94,365.

It has already been proposed to use knives the cutting edge of which projects only slightly from blunt faces at both sides. In knives of this type the thin cutting blade is enclosed between two plates and had to be secured in its position by means of screws and the like so that it was difficult to adjust the cutting edge. A further inconvenience is that at the grinding the protecting plates were damaged and for this reason it was necessary to remove the thin knife plate so that, after each grinding, the difficult operation of adjusting had to be repeated.

A great inconvenience connected with knives of this type is further that the knife blade projects sufficiently only at the point.

This invention has for its object to create a safety knife for skinning which renders possible an extraordinarily uniform and secure skinning. Damaging of the skin is absolutely excluded and with the improved knife, according to the invention, even an apprentice can perfectly skin, as cutting or slitting of the skin is impossible. The skins are consequently of greater value which is economically of great importance.

Owing to the fact that the knife can be uniformly utilized from the handle to the point much time is saved as less cuts are necessary for skinning.

According to the invention a slide-bar is removably fixed on an ordinary butcher's knife so that the cutting edge of the knife projects only very little but over the entire length of the knife.

A further improvement is that the removably fixed slide-bar has a stud engaging with a bayonet slot in the back of the knife and is held on the knife by a slidable element. The slide-bar has further an extension engaging with an indentation in the handle of the knife and is securely held in this position by a ring pushed over said extension.

Further improvements consist in the conical shape of the slide-bar, in the arrangement of an aperture for the thumb so that the knife is more securely held, and in a curved widening of the slide bar designed to make the knife as light as possible.

Two embodiments of the invention are shown, by way of example, in the accompanying drawings, in which:—

Fig. 1 shows the skinning knife in elevation.

Fig. 2 is a front elevation of the skinning knife, the handle being shown in section.

Fig. 3 is a cross section through the knife and the slide-bar.

Fig. 4 is a section through the upper end of the knife handle.

Fig. 5 shows in elevation a modified form of construction of the knife.

The butcher's knife $a$, which is of the usual construction and has a handle $b$, carries an exchangeable slide-bar $c$ from which the cutting edge $d$ of the knife projects very little but over the entire length of the knife. This slide-bar is removably attached near the knife point by means of a stud $e$ engaging with a bayonet slot $f$ in the knife back and further near the handle by means of an extension $g$ engaging with an indentation $h$ of the handle. A slidable ring $i$ is pushed over the extension $g$ to cover the same and to securely hold the slide-bar. This ring $i$ can be held in its position by clamping action or by means of a screw.

The slide-bar $c$ is of triangular cross section and its face $k$ is conical.

In proximity of the handle a concave indentation $l$ is arranged in the slide-bar designed for the thumb, so that the knife is securely held notwithstanding the strongly projecting slide-bar.

The slide bar is hollowed out as at $m$ for the purpose of keeping down the weight of the knife.

The stud $e$ has a head $n$ so that the slide-bar can not accidentally become detached from the knife.

If the knife is to be used by a right-handed person the slide-bar covers the knife, viewed from the back, on the left side in such a manner that the cutting edge $d$ of the knife projects only about 1 mm. from said slide-bar. For left-handed persons the slide-bar is mounted on the right side of the knife viewed from the back.

Owing to this single fixation of the slide-bar on the knife it is possible to sharpen the knife on the hone by a few manipulations. The slide-bar is made from light metal, for instance aluminium, and has to be removed if the knife has to be sharpened. If necessary the slide-bar can be easily made narrower by means of a scraper so that the distance between the edge of the slide-bar and the cutting edge of the knife remains always the same, 1 millimeter.

The knife can be consumed completely and it may be of any length.

In the form of construction shown in Fig. 5 the concave indentation $l$ for the thumb is arranged on the back near the handle. The knife is fixed in the handle in the usual manner.

I claim:—

1. A skinning knife of the character set forth, comprising in combination with a conventional blade and handle, a detachable safety member, adapted to cover practically the entire blade surface with the exception of a relatively narrow cutting edge portion, and means for holding said safety member in place near its two extremities.

2. A skinning knife of the character set forth, comprising in combination with a conventional blade and handle, a detachable safety member, adapted to cover practically the entire blade surface with the exception of a relatively narrow cutting edge portion, and means for holding said safety member in place, comprising a pin and slot connection near its outer end, and a sliding sleeve connection for its inner end.

3. A safety knife for protecting the skins at the skinning of cattle to be slaughtered, comprising in combination with an ordinary butcher's knife having a bayonet-slot in its back and with a handle of the knife said handle having a cavity in its inner end, a slide-bar removably fixed on said knife so that the cutting edge of the knife projects only very little from said slide-bar but over the entire length of the knife, and means for removably fixing the said slide-bar on said knife near the knife point, said means consisting of a stud on said slide-bar designed to engage with said bayonet slot of the knife, and means for removably fixing said slide-bar in the handle of said knife, and consisting of an extension of said slide-bar designed to engage with said cavity in the handle, and of a ring slidably mounted on said handle to be pushed over said extension of the slide-bar.

4. A safety knife for protecting the skins at the skinning of cattle to be slaughtered, comprising in combination with an ordinary butcher's knife, a slide-bar removably fixed on said knife so that the cutting edge of the knife projects only very little from said slide-bar but over the entire length of the knife said slide-bar being of triangular cross section so that its face parallel to the knife blade is conical and said slide bar having a concave indentation near the handle designed to receive the thumb.

5. A safety knife for protecting the skins at the skinning of cattle to be slaughtered, comprising in combination with an ordinary butcher's knife, a slide-bar removably fixed on said knife so that the cutting edge of the knife projects only very little from said slide-bar but over the entire length of the knife said slide-bar being of triangular cross section so that its face parallel to the knife blade is conical and said slide bar having a concave indentation near the handle designed to receive the thumb and said slide-bar being hollowed out for reducing the weight of the knife.

In testimony whereof I affix my signature.

FRITZ SCHULZ.